(12) United States Patent
Sasaki et al.

(10) Patent No.: US 10,297,277 B1
(45) Date of Patent: May 21, 2019

(54) MAGNETIC HEAD INCLUDING A COIL AND A MAGNETIC PATH FORMING SECTION

(71) Applicants: Yoshitaka Sasaki, Los Gatos, CA (US); Hiroyuki Ito, Mipitas, CA (US); Kazuki Sato, Milpitas, CA (US); Shigeki Tanemura, Milpitas, CA (US); Atsushi Yamaguchi, Milpitas, CA (US); Kei Hirata, Milpitas, CA (US)

(72) Inventors: Yoshitaka Sasaki, Los Gatos, CA (US); Hiroyuki Ito, Mipitas, CA (US); Kazuki Sato, Milpitas, CA (US); Shigeki Tanemura, Milpitas, CA (US); Atsushi Yamaguchi, Milpitas, CA (US); Kei Hirata, Milpitas, CA (US)

(73) Assignee: HEADWAY TECHNOLOGIES, INC., Milpitas (*) Notice: Subject to any disclaimer, the term of this patent is extended or adjusted under 35 U.S.C. 154(b) by 0 days.

(21) Appl. No.: 16/123,225

(22) Filed: Sep. 6, 2018

(51) Int. Cl.
*G11B 5/127* (2006.01)
*G11B 5/31* (2006.01)

(52) U.S. Cl.
CPC ............ *G11B 5/1278* (2013.01); *G11B 5/315* (2013.01)

(58) Field of Classification Search
CPC ........ G11B 5/127; G11B 5/1278; G11B 5/135

USPC ....................................... 360/123.01–123.07
See application file for complete search history.

(56) References Cited

U.S. PATENT DOCUMENTS

| | | | | |
|---|---|---|---|---|
| 8,593,762 | B1 * | 11/2013 | Sasaki ................. | G11B 5/1278 360/123.06 |
| 8,792,207 | B1 * | 7/2014 | Sasaki ................. | G11B 5/1278 360/123.06 |
| 9,495,980 | B1 * | 11/2016 | Sasaki ................. | G11B 5/1278 |
| 9,704,513 | B2 | 7/2017 | Sasaki et al. | |
| 2017/0125042 | A1 * | 5/2017 | Sasaki ................. | G11B 5/3123 |

* cited by examiner

*Primary Examiner* — Allen T Cao
(74) *Attorney, Agent, or Firm* — Oliff PLC

(57) ABSTRACT

A magnetic head includes a coil, and a magnetic path forming section for defining a first space for a portion of the coil to pass through. The magnetic path forming section includes a core section. The coil includes a first winding portion and a second winding portion connected in series. The first winding portion includes one or two first coil elements extending to pass through the first space, and extends once or twice around the entire perimeter of the core section. The second winding portion does not pass through the first space, and extends less than once around the entire perimeter of the core section to rotate n degrees about a center point of the core section, where n is greater than 270 and smaller than 360.

11 Claims, 12 Drawing Sheets

MAGNETIC HEAD INCLUDING A COIL AND A MAGNETIC PATH FORMING SECTION

BACKGROUND OF THE INVENTION

1. Field of the Invention

The present invention relates to a magnetic head including a coil and a magnetic path forming section, the magnetic path forming section forming a magnetic path for passing a magnetic flux corresponding to a magnetic field produced by the coil.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a magnetic path forming section. The coil produces a magnetic field corresponding to data to be written on the recording medium. The magnetic path forming section is formed of a magnetic material and forms a magnetic path for passing a magnetic flux corresponding to a magnetic field produced by the coil. The magnetic path forming section includes, for example, a main pole having a first end face located in a medium facing surface configured to face a recording medium, and a return path section connected to the main pole and having a second end face located in the medium facing surface. The main pole produces, from the first end face, a write magnetic field for writing the data on the recording medium.

Magnetic heads for perpendicular magnetic recording are increasing in frequency of write signals to achieve higher recording densities. For such magnetic heads, it is thus required that the write current flowing through the coil should exhibit a rapid rise. To meet the requirement, it is effective to shorten the magnetic path formed by the magnetic path forming section. The magnetic path forming section defines a space for part of the coil to pass through. Reducing the number of turns of the coil is effective for shortening the aforementioned magnetic path.

U.S. Pat. No. 9,704,513 B2 discloses a magnetic head including a coil, a main pole, and a return path section. The return path section of this magnetic head includes a yoke section and a coupling section for coupling the yoke section to the main pole. The coil includes a first winding portion and a second winding portion connected in series. The first winding portion extends once around the entire perimeter of the coupling section. The second winding portion surrounds only ½ to ¾ of the entire perimeter of the coupling section.

The magnetic head disclosed in U.S. Pat. No. 9,704,513 B2 allows a reduction in length of the magnetic path passing through the return path section and the main pole and also allows an increase in the magnetomotive force of the coil.

A technology called thermally-assisted magnetic recording has been proposed in order to increase the recording density of a magnetic recording device. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

In a magnetic head for use in thermally-assisted magnetic recording, the presence of the waveguide increases the length of the magnetic path formed by the magnetic path forming section. It is thus strongly desired to reduce the length of the magnetic path and increase the magnetomotive force in such a magnetic head.

SUMMARY OF THE INVENTION

It is an object of the present invention to provide a magnetic head that enables a sufficient reduction in length of the magnetic path formed by the magnetic path forming section and also a sufficient increase in the magnetomotive force of the coil.

A magnetic head of the present invention includes: a medium facing surface configured to face a recording medium; a coil configured to produce a magnetic field corresponding to data to be written on the recording medium; and a magnetic path forming section for defining a first space for a portion of the coil to pass through, and forming a magnetic path for passing a magnetic flux corresponding to the magnetic field produced by the coil. The magnetic path forming section has a first end face located in the medium facing surface and a second end face located in the medium facing surface, and is configured to produce from the first end face a write magnetic field for writing data on the recording medium.

The magnetic path forming section includes a first core section. The coil is wound around the entire perimeter of the first core section when viewed in a first direction, the first direction being a direction perpendicular to a second direction and a third direction, the second direction being the direction of track width, the third direction being a direction perpendicular to the medium facing surface.

The coil includes a first winding portion and a second winding portion connected in series. The first winding portion includes one or two first coil elements extending to pass through the first space, and extends once or twice around the entire perimeter of the first core section when viewed in the first direction. The second winding portion does not pass through the first space and, when viewed in the first direction, the second winding portion extends less than once around the entire perimeter of the first core section and rotates n degrees about a center point of the first core section. The center point of the first core section is a point located at a center of the first core section in the second direction and also in the third direction when viewed in the first direction. The foregoing n is greater than 270 and smaller than 360. The foregoing n may be no smaller than 288 and no greater than 324.

In the magnetic head of the present invention, the first core section may include a first portion and a second portion coupled to each other. When viewed in the first direction, the first portion is located closer to the medium facing surface than the second portion. The first portion is smaller than the second portion in maximum dimension in the second direction. The second winding portion has an end that is located on the opposite side from the boundary between the first winding portion and the second winding portion when viewed in the first direction. When viewed in the first direction, the end of the second winding portion may be located on one side of the first portion in the second direction.

In the magnetic head of the present invention, the magnetic path forming section may include: a main pole having the first end face; and a first return path section having the second end face and connected to the main pole. In such a case, the first return path section may include the first core section. The magnetic path forming section may further include a second return path section connected to the main pole and having a third end face located in the medium facing surface. The main pole and the second return path section may define a second space for another portion of the coil to pass through.

The second return path section may include a second core section. In this case, the coil may include a third winding portion. The third winding portion includes one third coil element extending to pass through the second space, and extends once around the entire perimeter of the second core portion when viewed in the first direction. In this case, the first return path section may be located on the front side in the direction of travel of the recording medium relative to the main pole, and the second return path section may be located on the rear side in the direction of travel of the recording medium relative to the main pole. Alternatively, the first return path section may be located on the rear side in the direction of travel of the recording medium relative to the main pole, and the second return path section may be located on the front side in the direction of travel of the recording medium relative to the main pole.

When the second return path section includes the second core section, the coil may further include a third winding portion and a fourth winding portion connected in series. The third winding portion includes one or two third coil elements extending to pass through the second space, and extends once or twice around the entire perimeter of the second core section when viewed in the first direction. The fourth winding portion does not pass through the second space and, when viewed in the first direction, the fourth winding portion extends less than once around the entire perimeter of the second core section and rotates m degrees about a center point of the second core section. The center point of the second core section is a point located at a center of the second core section in the second direction and also in the third direction when viewed in the first direction. The foregoing m may be greater than 270 and smaller than 360. The foregoing m may be no smaller than 288 and no greater than 324.

The second core section may include a third portion and a fourth portion coupled to each other. When viewed in the first direction, the third portion is located closer to the medium facing surface than the fourth portion. The third portion is smaller than the fourth portion in maximum dimension in the second direction. The fourth winding portion has an end that is located on the opposite side from the boundary with the third winding portion when viewed in the first direction. When viewed in the first direction, the end of the fourth winding portion may be located on one side of the third portion in the second direction.

In the present invention, while the first winding portion includes the one or two first coil elements extending to pass through the first space, the second winding portion does not pass through the first space. The present invention thereby makes it possible to sufficiently reduce the length of the magnetic path formed by the magnetic path forming section, and to sufficiently increase the magnetomotive force of the coil.

Other objects, features and advantages of the present invention will become fully apparent from the following description.

DETAILED DESCRIPTION OF THE PREFERRED EMBODIMENTS

First Embodiment

Figure 1:
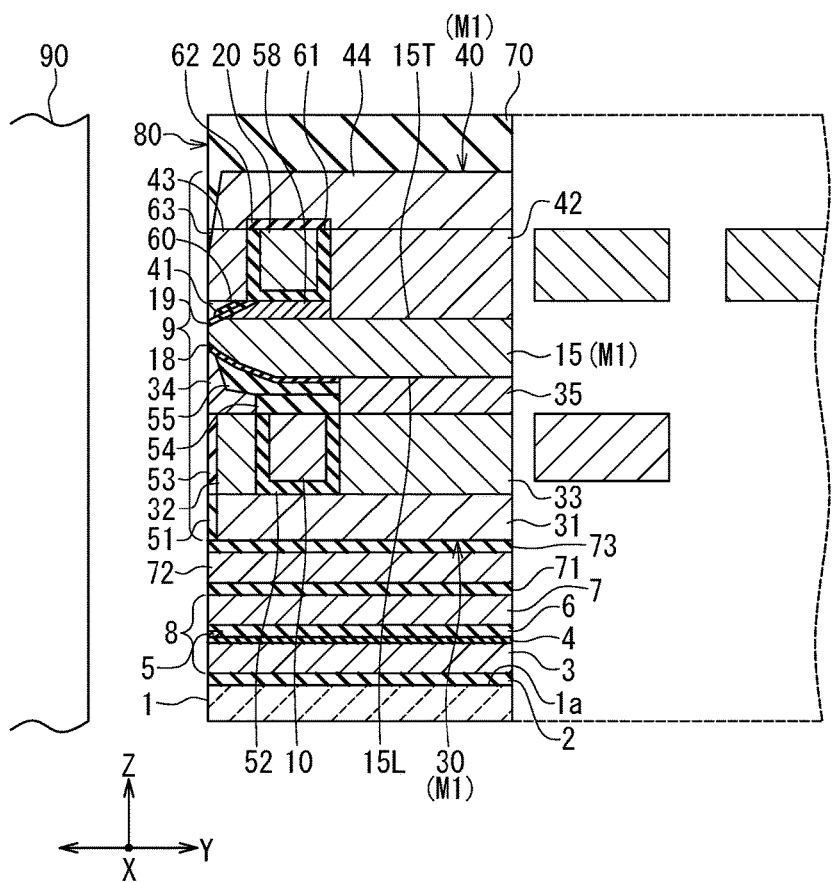
FIG. 1 is a cross-sectional view of a magnetic head according to a first embodiment of the invention.
Figure 2:
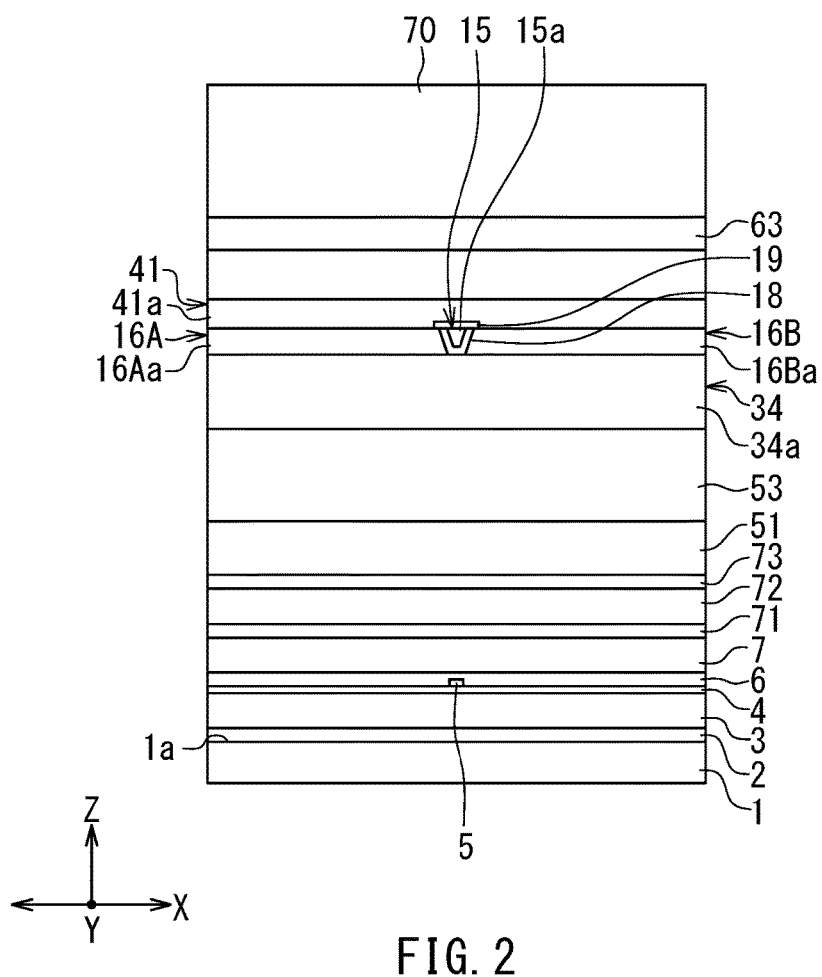
FIG. 2 is a front view showing the medium facing surface of the magnetic head according to the first embodiment of the invention.
Figure 3:
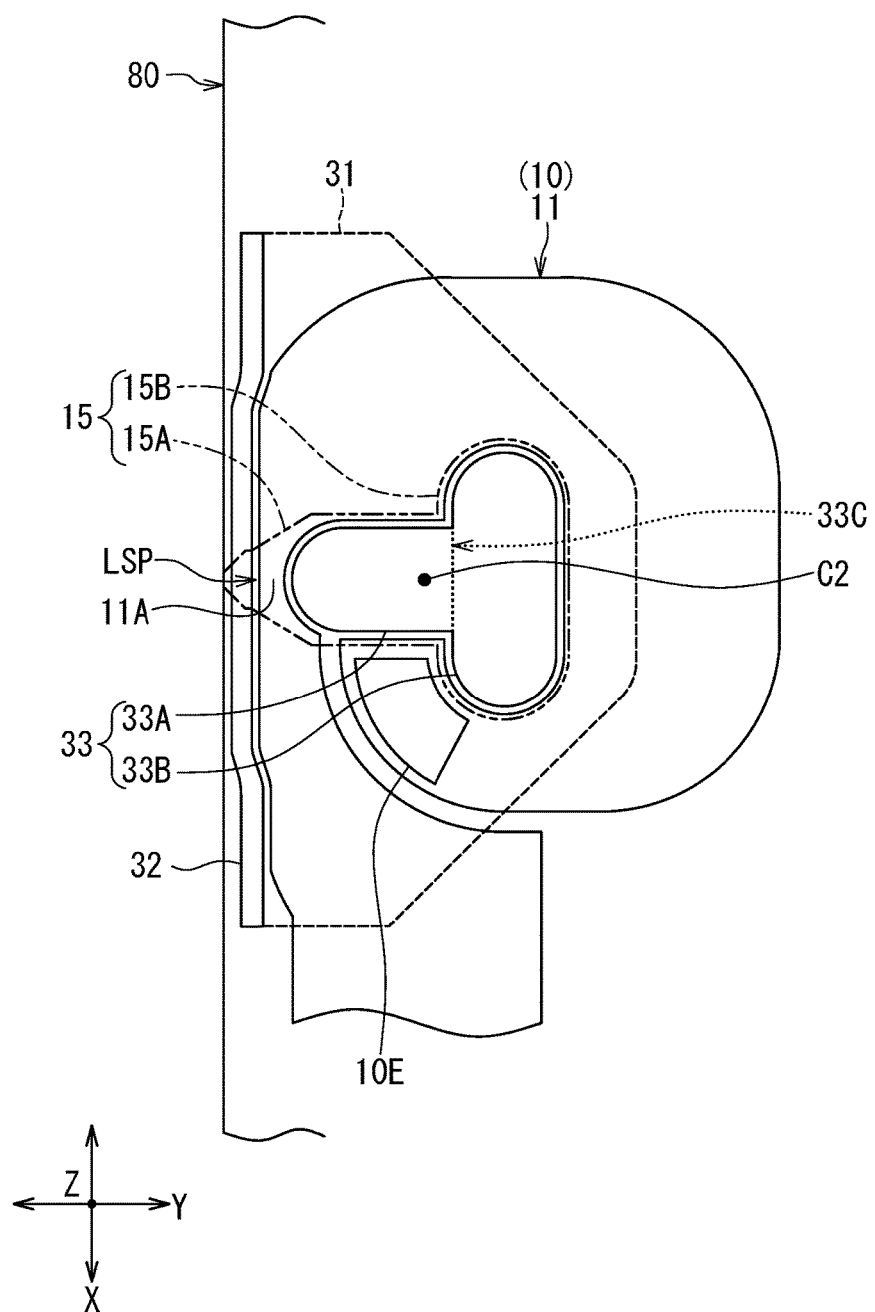
FIG. 3 is a plan view showing a lower coil portion and a lower core section of the magnetic head according to the first embodiment of the invention.
Figure 4:
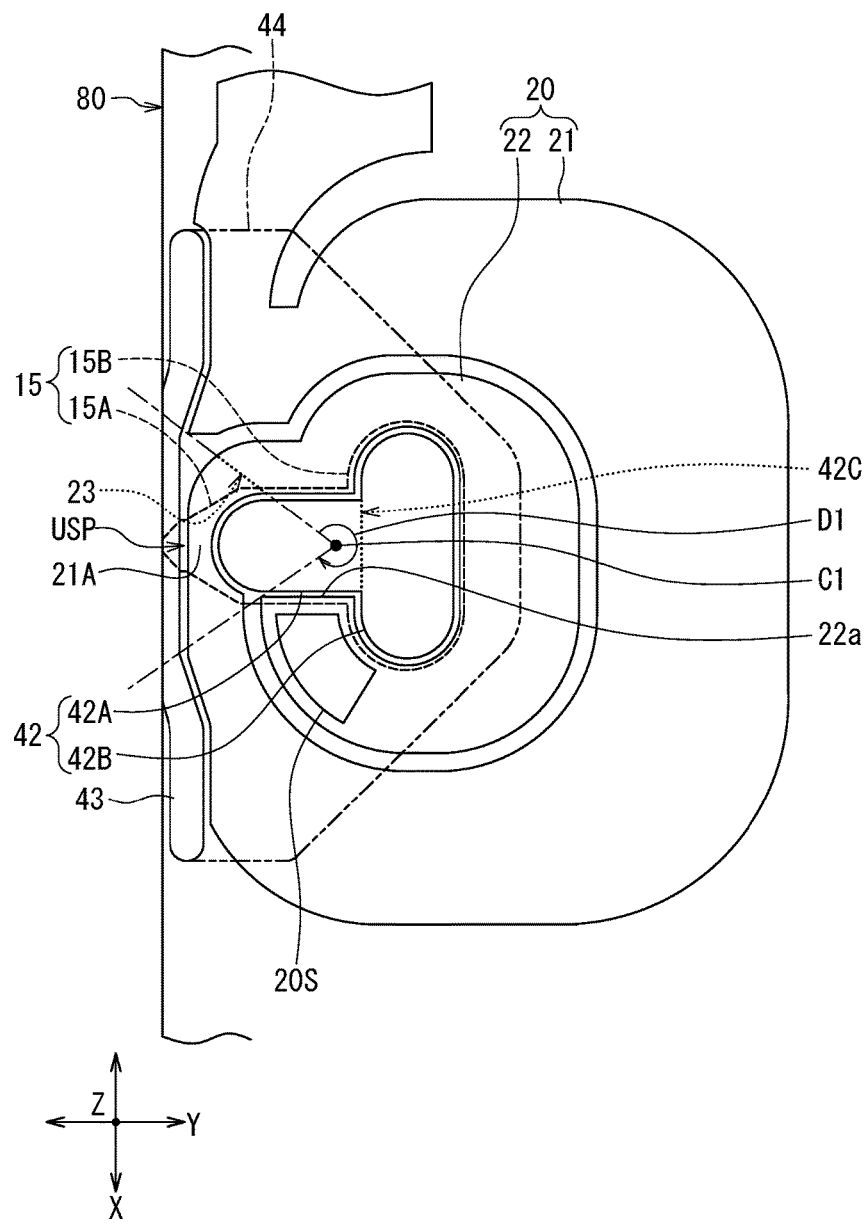
FIG. 4 is a plan view showing an upper coil portion and an upper core section of the magnetic head according to the first embodiment of the invention.

Preferred embodiments of the present invention will now be described in detail with reference to the drawings. First, reference is made to FIG. 1 to FIG. 4 to describe the configuration of a magnetic head according to a first embodiment of the invention. FIG. 1 is a cross-sectional view of the magnetic head according to the present embodiment. FIG. 2 is a front view showing the medium facing surface of the magnetic head according to the present embodiment. FIG. 3 is a plan view showing a lower coil portion and a lower core section of the magnetic head according to the present embodiment. FIG. 4 is a plan view showing an upper coil portion and an upper core section of the magnetic head according to the present embodiment.

The magnetic head according to the present embodiment is a magnetic head for perpendicular magnetic recording. The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Now, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 1, the magnetic head has the medium facing surface 80 mentioned above. As shown in FIG. 1 and FIG. 2, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil and a magnetic path forming section M1. The coil is configured to produce a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel.

The magnetic path forming section M1 defines an upper space USP (see FIG. 4) for a portion of the coil to pass through, and forms a magnetic path for passing a magnetic flux corresponding to the magnetic field produced by the coil. In the present embodiment, the magnetic path forming section M1 includes a main pole 15, an upper return path section 40, and a lower return path section 30. The main pole 15 has a first end face 15a located in the medium facing surface 80. The magnetic path forming section M1 is configured to pass a magnetic flux corresponding to the magnetic field produced by the coil and to produce, from the first end face 15a, a write magnetic field for writing data on the recording medium 90 by means of a perpendicular magnetic recording system. FIG. 1 shows a cross section that intersects the first end face 15a of the main pole 15 and that is perpendicular to the medium facing surface 80 and to the top surface 1a of the substrate 1. Such a cross section will hereinafter be referred to as the main cross section.

Each of the upper return path section 40 and the lower return path section 30 is formed of a magnetic material. For example, CoFeN, CoNiFe, FeNi, or CoFe can be used as the material of the upper return path section 40 and the lower return path section 30. The upper return path section 40 is located on the front side in the direction of travel of the recording medium 90 (the Z direction) relative to the main pole 15, and is connected to part of the main pole 15 located away from the medium facing surface 80. Note that a location on the front side in the direction of travel of the recording medium 90 relative to the main pole 15 refers to a location that is farther from the top surface 1a of the substrate 1 than the main pole 15. The upper return path section 40 and the main pole 15 define the aforementioned upper space USP. The upper return path section 40 corresponds to the first return path section in the present invention. The upper space USP corresponds to the first space in the present invention.

The lower return path section 30 is located on the rear side in the direction of travel of the recording medium 90 (the Z direction) relative to the main pole 15, and is connected to part of the main pole 15 located away from the medium facing surface 80. Note that a location on the rear side in the direction of travel of the recording medium 90 relative to the main pole 15 refers to a location that is closer to the top surface 1a of the substrate 1 than the main pole 15. The lower return path section 30 and the main pole 15 define a lower space LSP (see FIG. 3) for another portion of the coil to pass through. The lower return path section 30 corresponds to the second return path section in the present invention. The lower space LSP corresponds to the second space in the present invention.

The lower return path section 30 includes a lower shield 34, a lower core section 33, and coupling sections 31, 32 and 35. The lower core section 33 corresponds to the second core section in the present invention. The coupling section 31 is disposed on the nonmagnetic layer 73. The coupling section 32 and the lower core section 33 are both disposed on the coupling section 31. The coupling section 32 is located near the medium facing surface 80. The lower core section 33 is located farther from the medium facing surface 80 than the coupling section 32. The coupling sections 31 and 32 have their respective end faces facing toward the medium facing surface 80, and those end faces are located at a distance from the medium facing surface 80.

As shown in FIG. 3, the lower coil portion 10 is wound around the lower core section 33. The write head unit 9 further includes: an insulating layer 51 formed of an insulating material, lying on the nonmagnetic layer 73 and surrounding the coupling section 31; an insulating film 52 formed of an insulating material and isolating the lower coil portion 10 from the coupling sections 31 and 32 and the lower core section 33; and an insulating layer 53 formed of an insulating material and disposed around the lower coil portion 10 and the coupling section 32. The top surfaces of the lower coil portion 10, the coupling section 32, the lower core section 33, the insulating film 52 and the insulating layer 53 are even with each other. The insulating layers 51 and 53 and the insulating film 52 are formed of alumina, for example.

The lower shield 34 lies on the coupling section 32 and the insulating layer 53. The coupling section 35 lies on the lower core section 33. The write head unit 9 further includes an insulating layer 54 formed of an insulating material, and a nonmagnetic layer 55 formed of a nonmagnetic material. The insulating layer 54 lies on the lower coil portion 10, the insulating film 52 and the insulating layer 53. The nonmagnetic layer 55 lies on the insulating layer 54 and surrounds the lower shield 34 and the coupling section 35. The insulating layer 54 and the nonmagnetic layer 55 are formed of alumina, for example.

Part of the main pole 15 lies above the top surfaces of the lower shield 34 and the nonmagnetic layer 55. The magnetic path forming section M1 further includes two side shields 16A and 16B disposed on the lower shield 34 and opposed to each other in the track width direction (the X direction) with the main pole 15 therebetween. Each of the side shields 16A and 16B is formed of a magnetic material. For example, CoFeN, CoNiFe, FeNi, or CoFe can be used as the material of the side shields 16A and 16B.

The lower shield 34 has a lower-shield end face 34a located in the medium facing surface 80. The side shield 16A has an end face 16Aa located in the medium facing surface 80. The side shield 16B has an end face 16Ba located in the medium facing surface 80. The lower-shield end face 34a is located on the rear side in the direction of travel of the recording medium 90 (the Z direction) relative to the first end face 15a of the main pole 15. The end faces 16Aa and 16Ba are located on opposite sides of the first end face 15a of the main pole 15 in the track width direction (the X direction).

The main pole 15 has: the first end face 15a; a bottom end 15L (see FIG. 1) facing toward the top surface 1a of the substrate 1; a top surface 15T (see FIG. 1) opposite to the bottom end 15L; and a first side surface and a second side surface (see FIG. 2 to FIG. 4) opposite to each other in the track width direction (the X direction). As shown in FIG. 2, the side shield 16A has a first sidewall opposed to a portion of the first side surface of the main pole 15 located near the medium facing surface 80. The side shield 16B has a second sidewall opposed to a portion of the second side surface of the main pole 15 located near the medium facing surface 80.

The write head unit 9 further includes a first gap layer 18 formed of a nonmagnetic material. The first gap layer 18 is disposed to extend along the first and second sidewalls of the side shields 16A and 16B, the top surface of the lower shield 34 and the top surface of the nonmagnetic layer 55. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

As shown in FIG. 1, the first gap layer 18 is interposed between a portion of the bottom end 15L of the main pole 15 and the top surfaces of the lower shield 34 and the nonmagnetic layer 55. As shown in FIG. 2, the first gap layer 18 is interposed also between the first side surface of the main pole 15 and the first sidewall of the side shield 16A, and between the second side surface of the main pole 15 and the second sidewall of the side shield 16B.

At a location apart from the medium facing surface 80, the bottom end 15L of the main pole 15 is in contact with the top surface of the coupling section 35. The main pole 15 is formed of a ferromagnetic material containing one or more elements selected from Ni, Fe, and Co, such as FeNi, CoNiFe, or CoFe. The shape of the main pole 15 will be described in detail later.

The write head unit 9 further includes a nonmagnetic metal layer 58 formed of a nonmagnetic metal material and disposed on a first portion of the top surface 15T of the main pole 15, the first portion being located away from the medium facing surface 80. The nonmagnetic metal layer 58 is formed of Ru, NiCr, or NiCu, for example.

The write head unit 9 further includes a second gap layer 19. The second gap layer 19 is disposed to cover the main pole 15 and the nonmagnetic metal layer 58. The second gap layer 19 may be formed of a nonmagnetic insulating material such as alumina, or a nonmagnetic conductive material such as Ru, NiCu, Ta, W, NiB, or NiP.

The write head unit 9 further includes a nonmagnetic layer 60 formed of a nonmagnetic material and disposed on the second gap layer 19. The nonmagnetic layer 60 has an end closest to the medium facing surface 80, and this end is located at a distance from the medium facing surface 80. The nonmagnetic layer 60 is formed of alumina, for example.

The upper return path section 40 includes an upper shield 41, an upper core section 42, and coupling sections 43 and 44. The upper core section 42 corresponds to the first core section in the present invention. The upper shield 41 is disposed over the side shields 16A and 16B, the second gap layer 19 and the nonmagnetic layer 60, and is in contact with the top surfaces of the side shields 16A and 16B, the second gap layer 19 and the nonmagnetic layer 60.

The upper shield 41 has an upper-shield end face 41a located in the medium facing surface 80. The upper-shield end face 41a is located on the front side in the direction of travel of the recording medium 90 (the Z direction) relative to the first end face 15a of the main pole 15. In the medium facing surface 80, part of the upper-shield end face 41a is located at a predetermined distance from the first end face 15a of the main pole 15, the predetermined distance resulting from the thickness of the second gap layer 19. The thickness of the second gap layer 19 is preferably in the range of 5 to 60 nm, and may be 30 to 60 nm, for example.

The first end face 15a of the main pole 15 has a side that is in contact with the second gap layer 19, and this side defines the track width.

The upper core section 42 is disposed on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15.

The coupling section 43 is disposed on the upper shield 41. The coupling section 43 has an end face located in the medium facing surface 80, a top surface, and a connecting surface connecting the end face and the top surface. The distance from the medium facing surface 80 to any point on the connecting surface increases with increasing distance between the point and the top surface 1a of the substrate 1.

As shown in FIG. 4, the upper coil portion 20 is wound around the upper core section 42. The write head unit 9 further includes: a first insulating film 61 formed of an insulating material and separating at least part of the upper coil portion 20 from the second gap layer 19, the upper core section 42, the coupling section 43, the nonmagnetic metal layer 58 and the nonmagnetic layer 60; a second insulating film 62 formed of an insulating material and disposed to cover at least part of the upper coil portion 20 and the first insulating film 61; and an insulating layer 63 formed of an insulating material and disposed around the upper coil portion 20 and the coupling section 43. The first and second insulating films 61 and 62 and the insulating layer 63 are formed of alumina, for example.

The coupling section 44 is disposed on the upper core section 42, the coupling section 43 and the second insulating film 62. The coupling section 44 has an end face facing toward the medium facing surface 80, and this end face is located at a distance from the medium facing surface 80.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction of travel of the recording medium 90 (the Z direction) relative to the read head unit 8.

The write head unit 9 includes the coil and the magnetic path forming section M1. The coil includes the upper coil portion 20 and the lower coil portion 10. The magnetic path forming section M1 includes the main pole 15, the upper return path section 40 and the lower return path section 30. The upper return path section 40 includes the upper shield 41 and the upper core section 42. The lower return path section 30 includes the lower shield 34 and the lower core section 33.

The upper shield 41 has the upper-shield end face 41a. The upper-shield end face 41a corresponds to the second end face in the present invention. Since the upper shield 41 is part of the upper return path section 40, one can say that the upper return path section 40 has the upper-shield end face 41a, i.e., the second end face. The lower shield 34 has the lower-shield end face 34a. The lower-shield end face 34a corresponds to the third end face in the present invention. Since the lower shield 34 is part of the lower return path section 30, one can say that the lower return path section 30 has the lower-shield end face 34a, i.e., the third end face.

The magnetic path forming section M1 further includes the side shields 16A and 16B. The upper shield 41, the lower shield 34 and the side shields 16A and 16B capture a disturbance magnetic field applied to the magnetic head from outside the magnetic head. This can prevent erroneous writing on the recording medium 90 that would be caused by the disturbance magnetic field being intensively captured into the main pole 15. The upper shield 41, the lower shield 34 and the side shields 16A and 16B further have the function of capturing a magnetic flux that is produced from the first end face 15a of the main pole 15 and spreads in directions other than the direction perpendicular to the plane of the recording medium 90, and thereby preventing the magnetic flux from reaching the recording medium 90. Furthermore, the upper return path section 40, the lower return path section 30 and the side shields 16A and 16B have the function of allowing a magnetic flux that has been produced from the first end face 15a of the main pole 15 and has magnetized a portion of the recording medium 90 to flow back.

The magnetic path forming section M1 includes a first magnetic path from the upper-shield end face 41a to the first end face 15a. The first magnetic path is formed by the main pole 15 and the upper return path section 40. The upper space USP is defined by the first magnetic path.

The magnetic path forming section M1 further includes a second magnetic path from the lower-shield end face 34a to the first end face 15a. The second magnetic path is formed by the main pole 15 and the lower return path section 30. The lower space LSP is defined by the second magnetic path.

The shape of the main pole 15 will now be described in detail with reference to FIG. 1 to FIG. 4. As shown in FIG. 3 and FIG. 4, the main pole 15 includes a track width defining portion 15A having the first end face 15a and an end opposite thereto, and a wide portion 15B connected to the end of the track width defining portion 15A. The main pole 15 has the bottom end 15L, the top surface 15T, and first and second side parts. The width of the top surface 15T in the track width direction (the X direction) is greater in the wide portion 15B than in the track width defining portion 15A. In the track width defining portion 15A, the width of the top surface 15T in the track width direction gradually increases with increasing distance from the medium facing surface 80, and then becomes constant.

As shown in FIG. 1, the top surface 15T includes a first inclined portion and a first flat portion, the first inclined portion being located closer to the medium facing surface 80 than the first flat portion. The first inclined portion has a first end located in the medium facing surface 80 and a second end opposite to the first end. The first flat portion is connected to the second end of the first inclined portion. The first inclined portion is inclined such that the second end is located on the front side in the direction of travel of the recording medium 90 (the Z direction) relative to the first end. The first flat portion extends in a direction substantially perpendicular to the medium facing surface 80 (the Y direction).

As shown in FIG. 1, the bottom end 15L includes a second inclined portion and a second flat portion, the second inclined portion being located closer to the medium facing surface 80 than the second flat portion. The second inclined portion has a third end located in the medium facing surface 80 and a fourth end opposite to the third end. The second inclined portion may be an edge formed by two intersecting planes, or may be a plane connecting two planes to each other. The second flat portion is a plane connected to the fourth end of the second inclined portion. The second inclined portion is inclined such that the fourth end is located on the rear side in the direction of travel of the recording medium 90 (the Z direction) relative to the third end. The second flat portion extends in a direction substantially perpendicular to the medium facing surface 80 (the Y direction).

As shown in FIG. 2, the first end face 15a of the main pole 15 has a first side in contact with the second gap layer 19, a second side connected to one end of the first side, and a third side connected to the other end of the first side. The first side defines the track width. The position of an end of a record bit to be recorded on the recording medium 90 is determined by the position of the first side. The width of the first end face 15a of the main pole 15 in the track width direction (the X direction) decreases with increasing distance from the first side, that is, with decreasing distance to the top surface 1a of the substrate 1. Each of the second side and the third side forms an angle in the range of, for example, 7° to 17°, preferably in the range of 10° to 15°, with respect to the direction perpendicular to the top surface 1a of the substrate 1. The first side has a length in the range of 0.05 to 0.20 µm, for example.

Reference is now made to FIG. 3 and FIG. 4 to describe in detail the upper and lower coil portions 20 and 10 of the coil and the upper and lower core sections 42 and 33. The lower coil portion 10 has a coil connection 10E electrically connected to the upper coil portion 20. The upper coil portion 20 has a coil connection 20S electrically connected to the coil connection 10E of the lower coil portion 10. The coil connection 20S is electrically connected to the coil connection 10E via a connection layer of columnar shape (not illustrated) that penetrates a plurality of layers interposed between the upper coil portion 20 and the lower coil portion 10. The coil connection 20S lies on the connection layer. The connection layer is formed of a conductive material such as copper. In the example shown in FIG. 3 and FIG. 4, the upper coil portion 20 and the lower coil portion 10 are connected in series.

Now, a first direction, a second direction, and a third direction will be defined as follows. The first direction is a direction parallel to the Z direction. The second direction is the track width direction, i.e., the X direction. The third direction is a direction perpendicular to the medium facing surface 80, i.e., the Y direction. The first direction is perpendicular to the second and third directions. FIG. 3 shows the lower coil portion 10 and the lower core section 33 as viewed in the first direction. FIG. 4 shows the upper coil portion 20 and the upper core section 42 as viewed in the first direction.

As shown in FIG. 4, when viewed in the first direction, the upper coil portion 20 is wound around the entire perimeter of the upper coupling section 42. The upper coil portion 20 includes a first winding portion 21 and a second winding portion 22 connected in series. In FIG. 4, the boundary 23 between the first winding portion 21 and the second winding portion 22 is shown by a dotted line. The first winding portion 21 includes one or two first coil elements extending to pass through the upper space USP, and extends once or twice around the entire perimeter of the upper core section 42 when viewed in the first direction. A coil element refers to part of the winding of the coil. In the present embodiment, the first winding portion 21 includes one first coil element 21A, and extends once around the entire perimeter of the upper core section 42 when viewed in the first direction.

In FIG. 4, the point denoted by symbol C1 indicates a center point C1 of the upper core section 42. The center point C1 of the upper core section 42 is a point located at a center of the upper core section 42 in the second direction (the X direction) and also in the third direction (the Y direction) when viewed in the first direction. The second winding portion 22 does not pass through the upper space USP and, when viewed in the first direction, the second winding portion 22 extends less than once around the entire perimeter of the upper core section 42 and rotates n degrees about the center point C1 of the upper core section 42. In FIG. 4, the arrow labeled D1 indicates the direction of rotation of the second winding portion 22. The foregoing n is greater than 270 and smaller than 360, and is preferably no smaller than 288 and no greater than 324. In the example shown in FIG. 4, n is 288. 270 degrees are ¾ of 360 degrees. 288 degrees are ⅘ of 360 degrees. 324 degrees are 9/10 of 360 degrees.

As shown in FIG. 4, the upper core section 42 includes a first portion 42A and a second portion 42B coupled to each other. In FIG. 4 the boundary 42C between the first portion 42A and the second portion 42B is indicated by a dotted line. When viewed in the first direction, the first portion 42A is located closer to the medium facing surface 80 than the second portion 42B. Further, when viewed in the first direction, the first portion 42A is smaller than the second portion 42B in maximum dimension in the second direction (the X direction).

In the example shown in FIG. 4, the first portion 42A has a shape that is long in the third direction (the Y direction) when viewed in the first direction. The first portion 42A includes a constant-width portion whose dimension in the second direction (the X direction) is substantially constant regardless of distance from the medium facing surface 80. The second portion 42B has a shape that is long in the second direction (the X direction) when viewed in the first direction.

The second winding portion 22 has an end 22a that is located on the opposite side from the boundary with the first winding portion 21 when viewed in the first direction. When viewed in the first direction, the end 22a of the second winding portion 22 is located on one side of the first portion 42A in the second direction (the X direction). In the example shown in FIG. 4, the end 22a of the second winding portion 22 is located at a predetermined distance from the constant-width portion of the first portion 42A.

As shown in FIG. 3, the lower coil portion 10 of the coil is wound around the entire perimeter of the lower core section 33 when viewed in the first direction. The lower coil portion 10 includes a third winding portion 11. The third winding portion 11 includes one third coil element 11A extending to pass through the lower space LSP, and extends once around the entire perimeter of the lower core section 33 when viewed in the first direction.

In FIG. 3, the point denoted by symbol C2 indicates a center point C2 of the lower core section 33. The center point C2 of the lower core section 33 is a point located at a center of the lower core section 33 in the second direction (the X direction) and also in the third direction (the Y direction) when viewed in the first direction. When viewed in the first direction, the lower coil portion 10 rotates 360 degrees or more about the center point C2 of the lower core section 33.

As shown in FIG. 3, the lower core section 33 includes a third portion 33A and a fourth portion 33B coupled to each other. In FIG. 3 the boundary 33C between the third portion 33A and the fourth portion 33B is indicated by a dotted line. When viewed in the first direction, the third portion 33A is located closer to the medium facing surface 80 than the fourth portion 33B. Further, when viewed in the first direction, the third portion 33A is smaller than the fourth portion 33B in maximum dimension in the second direction (the X direction).

In the example shown in FIG. 3, the third portion 33A has the same shape as the first portion 42A shown in FIG. 4. Specifically, the third portion 33A has a shape that is long in the third direction (the Y direction) when viewed in the first direction. The third portion 33A includes a portion whose dimension in the second direction (the X direction) is substantially constant regardless of distance from the medium facing surface 80.

In the example shown in FIG. 3, the fourth portion 33B has the same shape as the second portion 42B shown in FIG. 4. Specifically, the fourth portion 33B has a shape that is long in the second direction (the X direction) when viewed in the first direction.

Now, functions and effects specific to the magnetic head according to the present embodiment will be described. In the present embodiment, as described previously, the upper coil portion 20 of the coil includes the first winding portion 21 and the second winding portion 22 connected in series. The first winding portion 21 includes one first coil element 21A extending to pass through the upper space USP, whereas the second winding portion 22 includes no portion passing through the upper space USP. This makes it possible that, of the magnetic paths formed by the magnetic path forming section M1, the first magnetic path passing through the upper return path section 40 and the main pole 15 is reduced in length. The present embodiment thus makes it possible to achieve write signals of higher frequency, and to thereby achieve higher recording densities.

In the present embodiment, the second winding portion 22 is wound about the center point C1 of the upper core section 42 and extends less than once around the entire perimeter of the upper core section 42. The angle of rotation of the second winding portion 22 is greater than 270 degrees and smaller than 360 degrees. In other words, the second winding portion 22 has more than ¾ and less than one turn.

The magnetic head disclosed in U.S. Pat. No. 9,704,513 B2 will now be referred to as a magnetic head of a comparative example. As previously mentioned, the second winding portion of the coil of the magnetic head of the comparative example surrounds only ½ to ¾ of the entire perimeter of the coupling section. In other words, the second winding portion of the magnetic head of the comparative example is of no less than ½ and no more than ¾ turn. Thus, the second winding portion 22 has a larger turn than that of the second winding portion of the magnetic head of the comparative example. The present embodiment thus enables a sufficient increase in the magnetomotive force of the upper coil portion 20 of the coil.

In the present embodiment, the upper core section 42 includes the first portion 42A and the second portion 42B coupled to each other, and the first portion 42A is smaller than the second portion 42B in maximum dimension in the second direction (the X direction). Further, when viewed in the first direction, the end 22a of the second winding portion 22 is located on one side of the first portion 42A in the second direction (the X direction). By virtue of these features, the present embodiment allows the angle of rotation of the second winding portion 22 to be greater than in the case where the first portion 42A is not smaller than the second portion 42B in maximum dimension in the second direction. In the present embodiment, in particular, the foregoing features enables the second winding portion 22 to have more than ¾ and less than one turn.

Modification Examples

Figure 5:
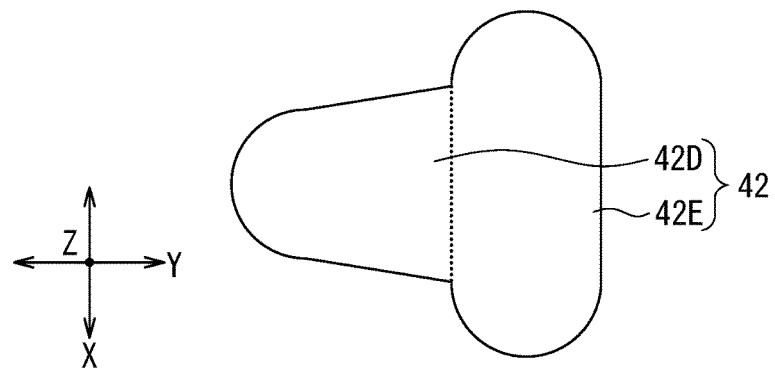
FIG. 5 is a plan view showing a first modification example of the upper core section of the first embodiment of the invention.

First to third modification examples of the upper core section 42 of the present embodiment will now be described. To begin with, the first modification example of the upper core section 42 will be described with reference to FIG. 5. FIG. 5 is a plan view showing the first modification example of the upper core section 42. In the first modification example, the upper core section 42 includes a first portion 42D and a second portion 42E coupled to each other, in place of the first and second portions 42A and 42B shown in FIG. 4. In FIG. 5, the boundary between the first portion 42D and the second portion 42E is indicated by a dotted line. The first portion 42D and the second portion 42E are arranged in the same manner as the first portion 42A and the second portion 42B. When viewed in the first direction, the first portion 42D is smaller than the second portion 42E in maximum dimension in the second direction (the X direction).

As shown in FIG. 5, the first portion 42D has a shape that is long in the third direction (the Y direction) when viewed in the first direction. The first portion 42D includes a varying-width portion whose dimension in the second direction (the X direction) increases with increasing distance from the medium facing surface 80 (see FIG. 4), in place of the foregoing constant-width portion. The end 22a (see FIG. 4) of the second winding portion 22 is located at a predetermined distance from the varying-width portion of the first portion 42D. The second portion 42E has the same shape as the second portion 42B shown in FIG. 4.

Figure 6:
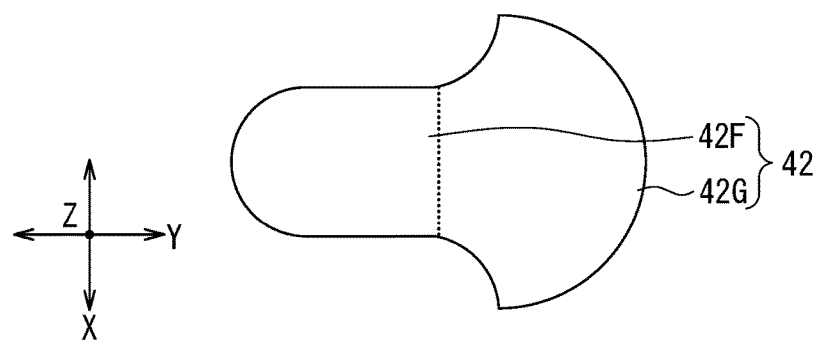
FIG. 6 is a plan view showing a second modification example of the upper core section of the first embodiment of the invention.

Next, the second modification example of the upper core section 42 will be described with reference to FIG. 6. FIG. 6 is a plan view showing the second modification example of the upper core section 42. In the second modification example, the upper core section 42 includes a first portion 42F and a second portion 42G coupled to each other, in place of the first portion 42A and the second portion 42B shown in FIG. 4. In FIG. 6, the boundary between the first portion 42F and the second portion 42G is indicated by a dotted line. The first portion 42F and the second portion 42G are arranged in the same manner as the first portion 42A and the second portion 42B. When viewed in the first direction, the first portion 42F is smaller than the second portion 42G in maximum dimension in the second direction (the X direction).

The first portion 42F has the same shape as the first portion 42A shown in FIG. 4. As shown in FIG. 6, the second portion 42G has a shape that is long in the second direction (the X direction) when viewed in the first direction. The second portion 42G includes a front portion coupled to the first portion 42F and a rear portion coupled to an end of the front portion opposite from the first portion 42F. The dimension of the front portion in the second direction (the X direction) is equal to that of the first portion 42F at the boundary with the first portion 42F, and then increases with increasing distance from the medium facing surface 80 (see FIG. 4). The dimension of the rear portion in the second direction (the X direction) is equal to that of the front portion at the boundary with the front portion, and then decreases with increasing distance from the medium facing surface 80 (see FIG. 4).

Figure 7:
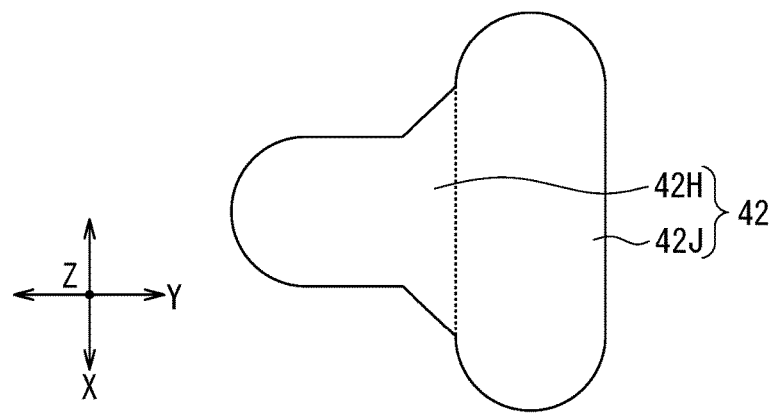
FIG. 7 is a plan view showing a third modification example of the upper core section of the first embodiment of the invention.

Reference is now made to FIG. 7 to describe the third modification example of the upper core section 42. FIG. 7 is a plan view showing the third modification example of the upper core section 42. In the third modification example, the upper core section 42 includes a first portion 42H and a second portion 42J coupled to each other, in place of the first portion 42A and the second portion 42B shown in FIG. 4. In FIG. 7, the boundary between the first portion 42H and the second portion 42J is indicated by a dotted line. The first portion 42H and the second portion 42J are arranged in the same manner as the first portion 42A and the second portion 42B. When viewed in the first direction, the first portion 42H is smaller than the second portion 42J in maximum dimension in the second direction (the X direction).

As shown in FIG. 7, the first portion 42H has a shape that is long in the third direction (the Y direction) when viewed in the first direction. The first portion 42H includes a constant-width portion whose dimension in the second direction (the X direction) is constant regardless of distance from the medium facing surface 80 (see FIG. 4), and a varying-width portion whose dimension in the second direction (the X direction) increases with increasing distance from the medium facing surface 80. The varying-width portion lies between the constant-width portion and the second portion 42J. The second portion 42J has the same shape as the second portion 42B shown in FIG. 4.

Second Embodiment

Figure 8:
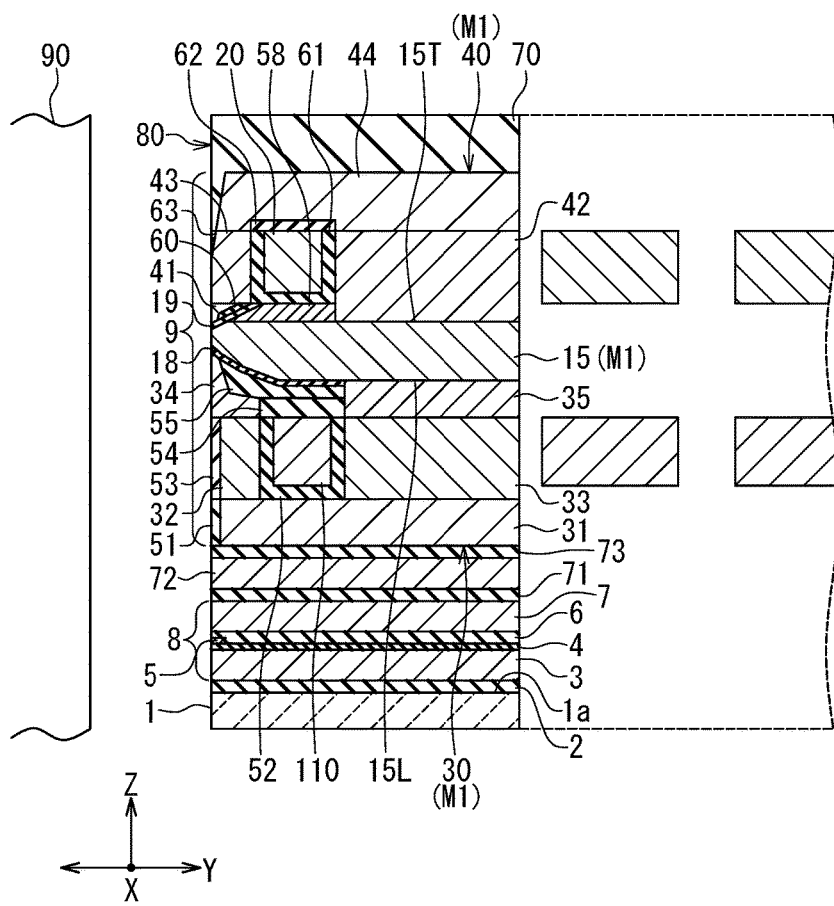
FIG. 8 is a cross-sectional view of a magnetic head according to a second embodiment of the invention.
Figure 9:
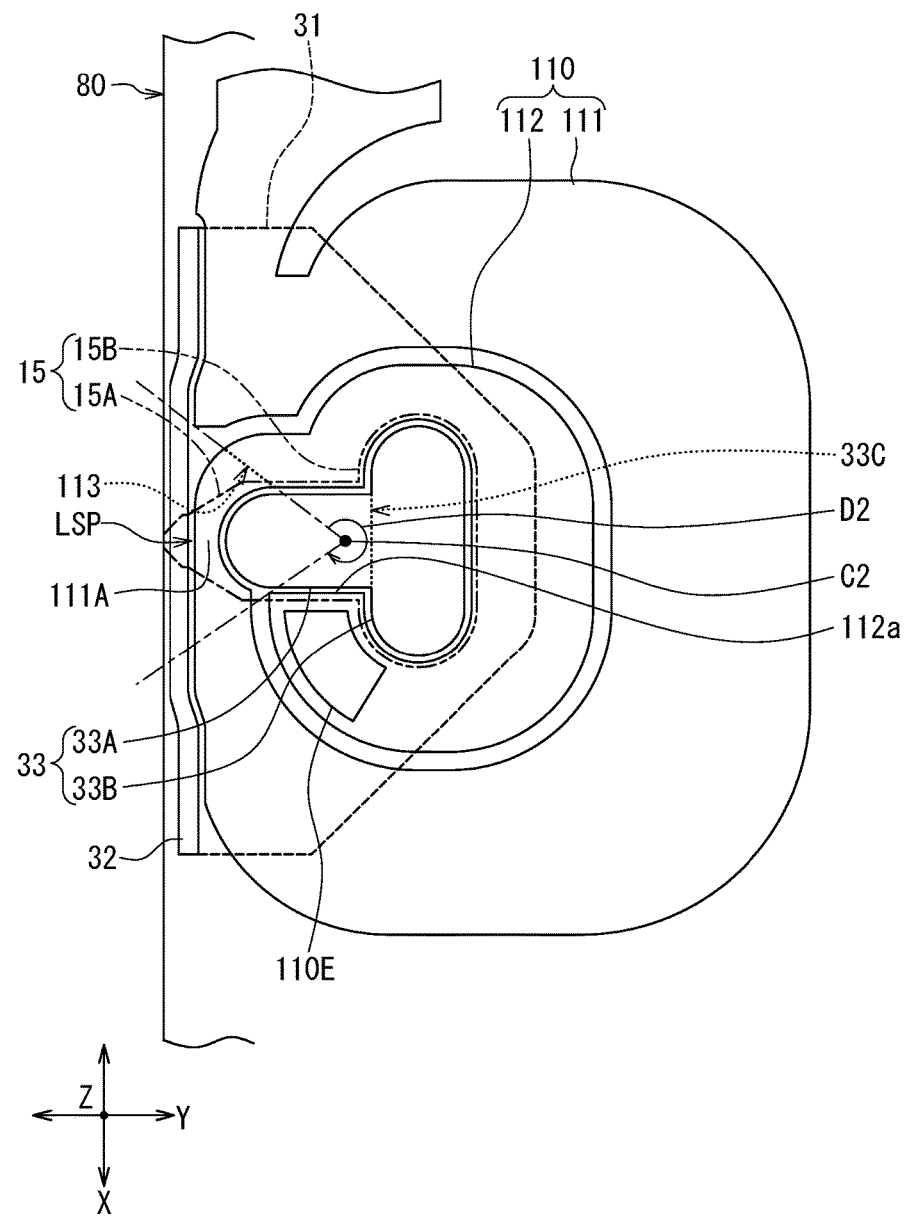
FIG. 9 is a plan view showing a lower coil portion and a lower core section of the magnetic head according to the second embodiment of the invention.

A magnetic head according to a second embodiment of the invention will now be described with reference to FIG. 8 and FIG. 9. FIG. 8 is a cross-sectional view of the magnetic head according to the present embodiment. FIG. 9 is a plan view showing a lower coil portion and a lower core section of the magnetic head according to the present embodiment.

The magnetic head according to the present embodiment differs from the magnetic head according to the first embodiment in the following ways. In the present embodiment, the coil includes a lower coil portion 110 in place of the lower coil portion 10 of the first embodiment. The lower coil portion 110 is formed of a conductive material such as copper. As shown in FIG. 8 and FIG. 9, the lower coil portion 110 is wound around the lower core section 33. The insulating film 52 and the insulating layers 53 and 54 are disposed around the lower coil portion 110.

The lower coil portion 110 has a coil connection 110E electrically connected to the upper coil portion 20. The coil connection 20S (see FIG. 4) of the upper coil portion 20 is electrically connected to the coil connection 110E via a connection layer of columnar shape (not illustrated) that penetrates a plurality of layers interposed between the upper coil portion 20 and the lower coil portion 110. In the present embodiment, the connection layer is disposed on the coil connection 110E.

As has been described in relation to the first embodiment, the first direction is a direction parallel to the Z direction. FIG. 9 shows the lower coil portion 110 and the lower core section 33 as viewed in the first direction. As shown in FIG. 9, when viewed in the first direction, the lower coil portion 110 is wound around the entire perimeter of the lower core section 33. The lower coil portion 110 includes a third winding portion 111 and a fourth winding portion 112 connected in series. In FIG. 9, the boundary 23 between the third winding portion 111 and the fourth winding portion 112 is shown by a dotted line. The third winding portion 111 includes one or two third coil elements extending to pass through the lower space LSP, and extends once or twice around the entire perimeter of the lower core section 33 when viewed in the first direction. In the present embodiment, the third winding portion 111 includes one third coil element 111A, and extends once around the entire perimeter of the lower core section 33 when viewed in the first direction.

In FIG. 9, the point denoted by symbol C2 indicates a center point C2 of the lower core section 33. The fourth winding portion 112 does not pass through the lower space LSP and, when viewed in the first direction, the fourth winding portion 112 extends less than once around the entire perimeter of the lower core section 33 and rotates m degrees about the center point C2 of the lower core section 33. In FIG. 9, the arrow labeled D2 indicates the direction of rotation of the fourth winding portion 112. The foregoing m is greater than 270 and smaller than 360, and is preferably no smaller than 288 and no greater than 324. In the example shown in FIG. 9, m is 288.

The fourth winding portion 112 has an end 112a that is located on the opposite side from the boundary with the third winding portion 111 when viewed in the first direction. When viewed in the first direction, the end 112a of the fourth winding portion 112 is located on one side of the third portion 33A of the lower core section 33 in the second direction (the X direction). In the example shown in FIG. 9, the end 112a of the fourth winding portion 112 is located at a predetermined distance from the constant-width portion of the third portion 33A.

In the present embodiment, as described above, the lower coil portion 110 of the coil includes the third winding portion 111 and the fourth winding portion 112 connected in series. The third winding portion 111 includes one third coil element 111A extending to pass through the lower space LSP, whereas the fourth winding portion 112 includes no portion passing through the lower space LSP. This makes it possible that, of the magnetic paths formed by the magnetic path forming section M1, the second magnetic path passing through the lower return path section 30 and the main pole 15 is reduced in length. The present embodiment thus makes it possible to achieve write signals of higher frequency, and to thereby achieve higher recording densities.

In the present embodiment, the fourth winding portion 112 is wound about the center point C2 of the lower core section 33 and extends less than once around the entire perimeter of the lower core section 33. The angle of rotation of the fourth winding portion 112 is greater than 270 degrees and smaller than 360 degrees. In other words, the fourth winding portion 112 has more than ¾ and less than one turn. Thus, the fourth winding portion 112 has a larger turn than that of the second winding portion of the magnetic head of the comparative example described in relation to the first embodiment. The present embodiment thus enables a sufficient increase in the magnetomotive force of the lower coil portion 110 of the coil.

In the present embodiment, the lower core section 33 includes the third portion 33A and the fourth portion 33B coupled to each other, and the third portion 33A is smaller than the fourth portion 33B in maximum dimension in the second direction (the X direction). Further, when viewed in the first direction, the end 112a of the fourth winding portion 112 is located on one side of the third portion 33A of the lower core section 33 in the second direction (the X direction). By virtue of these features, the present embodiment allows the angle of rotation of the fourth winding portion 112 to be greater than in the case where the third portion 33A is not smaller than the fourth portion 33B in maximum dimension in the second direction. In the present embodiment, in particular, the above-described features enables the fourth winding portion 112 to have more than ¾ and less than one turn.

The remainder of configuration, function and effects of the present embodiment are similar to those of the first embodiment.

Third Embodiment

Figure 10:
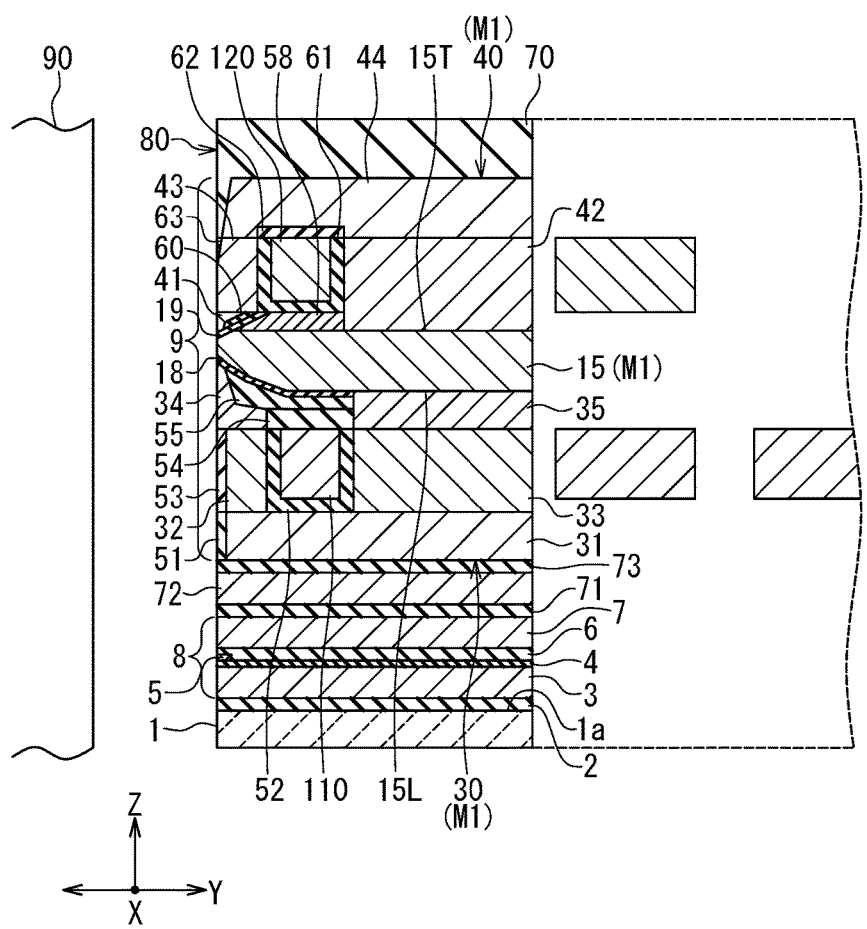
FIG. 10 is a cross-sectional view of a magnetic head according to a third embodiment of the invention.
Figure 11:
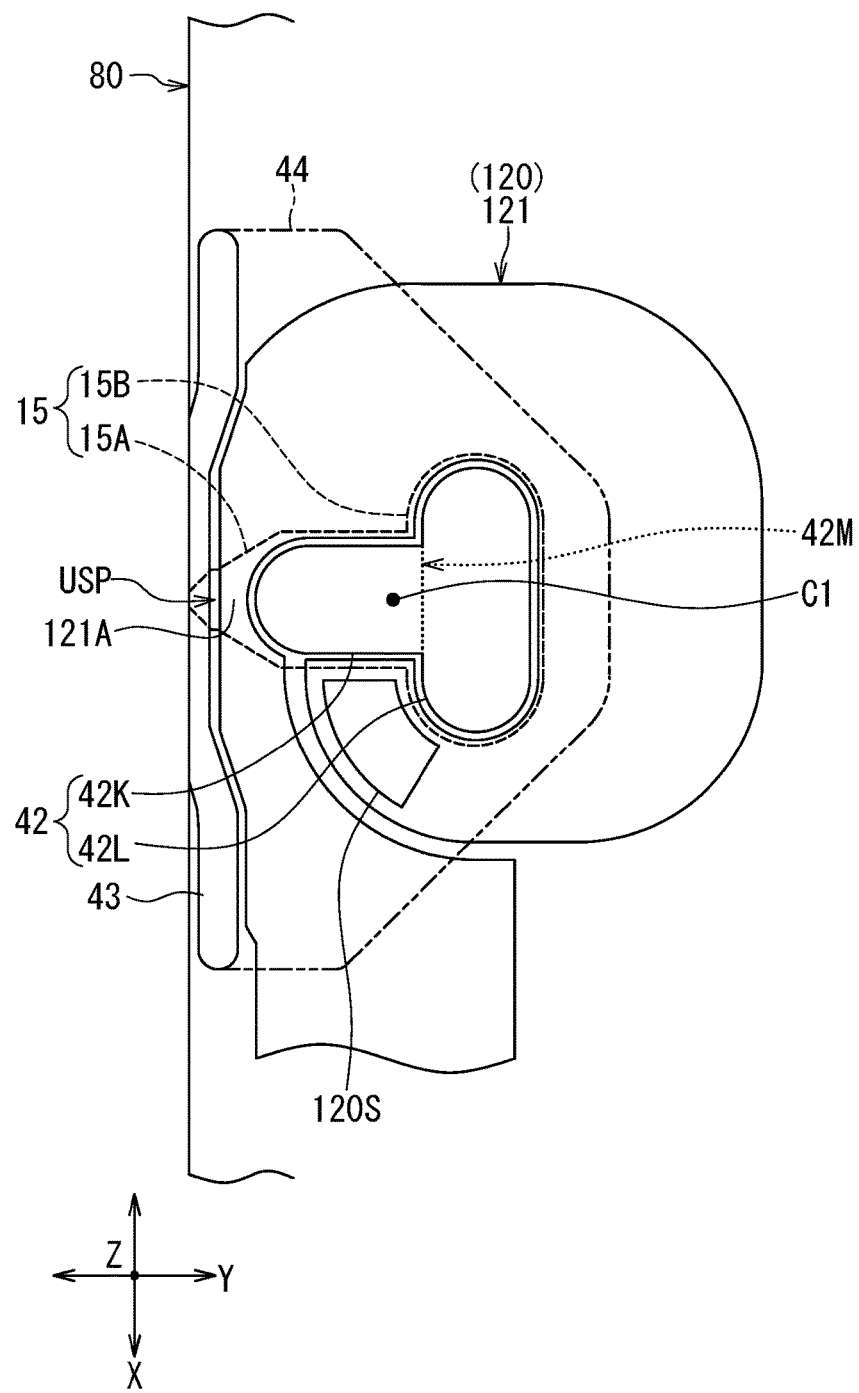
FIG. 11 is a plan view showing an upper coil portion and an upper core section of the magnetic head according to the third embodiment of the invention.

A magnetic head according to a third embodiment of the invention will now be described with reference to FIG. 10 and FIG. 11. FIG. 10 is a cross-sectional view of the magnetic head according to the present embodiment. FIG. 11 is a plan view showing an upper coil portion and an upper core section of the magnetic head according to the present embodiment.

The magnetic head according to the present embodiment differs to the magnetic head according to the second embodiment in the following ways. In the present embodiment, the correspondence of the upper and lower return path sections 40 and 30 with the first and second return path sections of the present invention is opposite to that in the second embodiment. More specifically, in the present embodiment, the lower return path section 30 corresponds to the first return path section of the present invention, and the upper return path section 40 corresponds to the second return path section of the present invention. In the present embodiment, the first return path section (the lower return path section 30) is located on the rear side in the direction of travel of the recording medium 90 (the Z direction) relative to the main pole 15, and the second return path section (the upper return path section 40) is located on the front side in the direction of travel of the recording medium 90 (the Z direction) relative to the main pole 15.

As has been described in relation to the first embodiment, the lower return path section 30 has the lower-shield end face 34a (see FIG. 2). In the present embodiment, the lower-shield end face 34a corresponds to the second end face of the present invention. The upper return path section 40 has the upper-shield end face 41a (see FIG. 2). In the present embodiment, the upper-shield end face 41a corresponds to the third end face of the present invention.

In the present embodiment, the correspondence of the upper and lower core sections 42 and 33 with the first and second core sections of the present invention is opposite to that in the second embodiment. More specifically, in the present embodiment, the lower core section 33 corresponds to the first core section of the present invention, and the upper core path section 42 corresponds to the second core section of the present invention.

The lower core section 33 includes a first portion and a second portion coupled to each other, in place of the third and fourth portions 33A and 33B (see FIG. 9) of the second embodiment. The first and second portions are shaped and located in the same manner as the third and fourth portions 33A and 33B of the second embodiment.

The upper core section 42 includes a third portion 42K and a fourth portion 42L coupled to each other, in place of the first and second portions 42A and 42B of the second embodiment. In FIG. 11 the boundary between the third portion 42K and the fourth portion 42L is indicated by a dotted line. The third and fourth portions 42K and 42L are shaped and located in the same manner as the first and second portions 42A and 42B of the second embodiment.

In the present embodiment, the correspondence of the upper and lower spaces USP and LSP (see FIG. 9) with the first and second spaces of the present invention is opposite to that in the second embodiment. More specifically, in the present embodiment, the lower space LSP corresponds to the first space of the present invention, and the upper space USP corresponds to the second space of the present invention.

In the present embodiment, the coil includes an upper coil portion 120, in place of the upper coil portion 20 of the second embodiment. The upper coil portion 120 is formed of a conductive material such as copper. As shown in FIG. 10 and FIG. 11, the upper coil portion 120 is wound around the upper core section 42. The first and second insulating films 61 and 62 and the insulating layer 63 are disposed around the upper coil portion 120.

The upper coil portion 120 has a coil connection 120S electrically connected to the lower coil portion 110. The coil connection 120S of the upper coil portion 120 is electrically connected to the coil connection 110E (see FIG. 9) of the lower coil portion 110 via a connection layer of columnar shape (not illustrated) that penetrates a plurality of layers interposed between the upper coil portion 120 and the lower coil portion 110. The coil connection 120S is disposed on the connection layer.

As has been described in relation to the second embodiment, the first direction is a direction parallel to the Z direction. FIG. 11 shows the upper coil portion 120 and the upper core section 42 as viewed in the first direction. As shown in FIG. 11, when viewed in the first direction, the upper coil portion 120 is wound around the entire perimeter of the upper core section 42. The upper coil portion 120 includes a third winding portion 121. The third winding portion 121 includes one third coil element 121A extending to pass through the upper space USP, and extends once around the entire perimeter of the upper core section 42 when viewed in the first direction.

In FIG. 11, the point denoted by symbol C1 indicates a center point C1 of the upper core section 42. The upper coil portion 120 rotates 360 degrees or more about the center point C1 of the upper core section 42 when viewed in the first direction.

In the present embodiment, the lower coil portion 110 includes a first winding portion and a second winding portion connected in series, in place of the third and fourth winding portions 111 and 112 (see FIG. 9) of the second embodiment. The first and second winding portions are shaped and located in the same manner as the third and fourth winding portions 111 and 112 of the second embodiment. The first winding portion includes one first coil element extending to pass through the lower space LSP.

The remainder of configuration, function and effects of the present embodiment are similar to those of the second embodiment.

Fourth Embodiment

Figure 12:
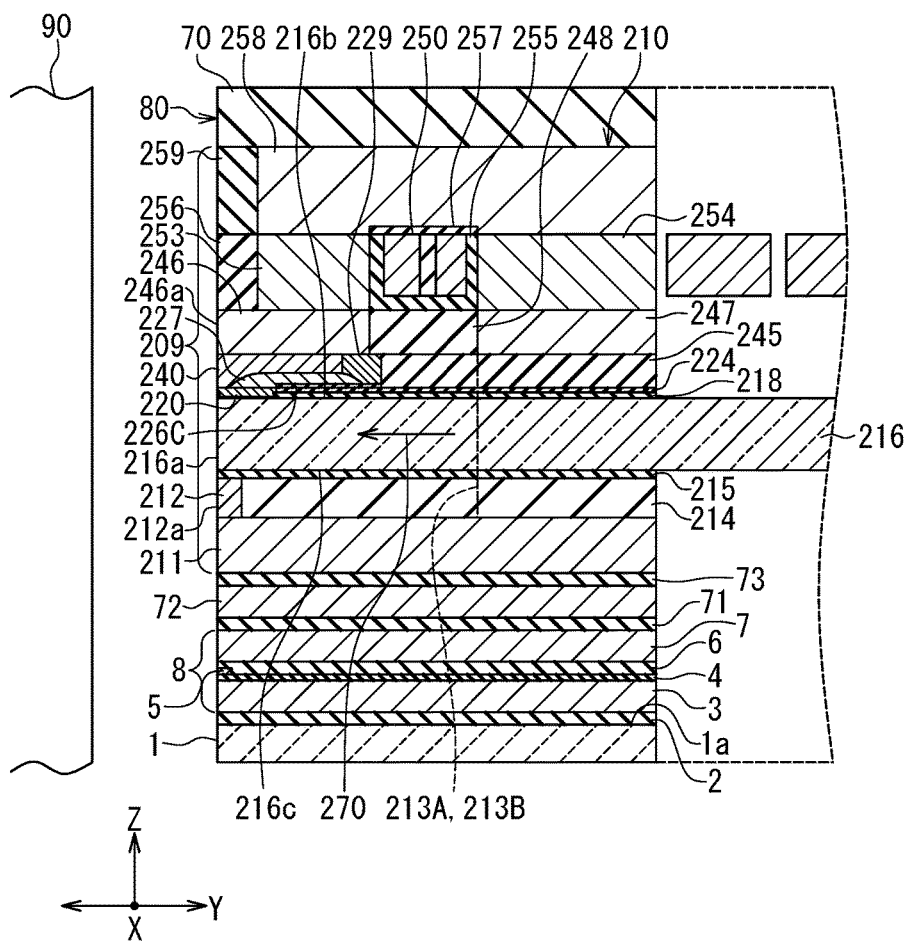
FIG. 12 is a cross-sectional view of a write head unit of a magnetic head according to a fourth embodiment of the invention.
Figure 13:
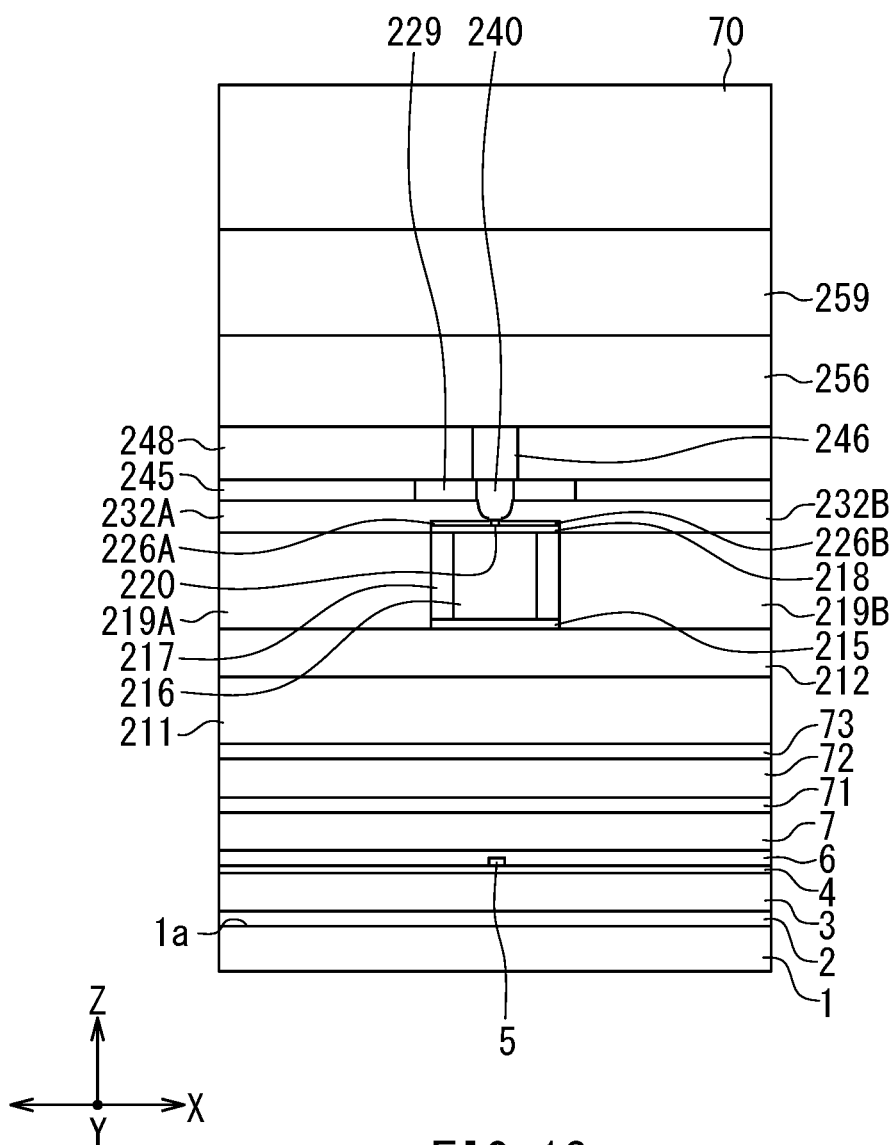
FIG. 13 is a front view of the write head unit of the magnetic head according to the fourth embodiment of the invention.
Figure 14:
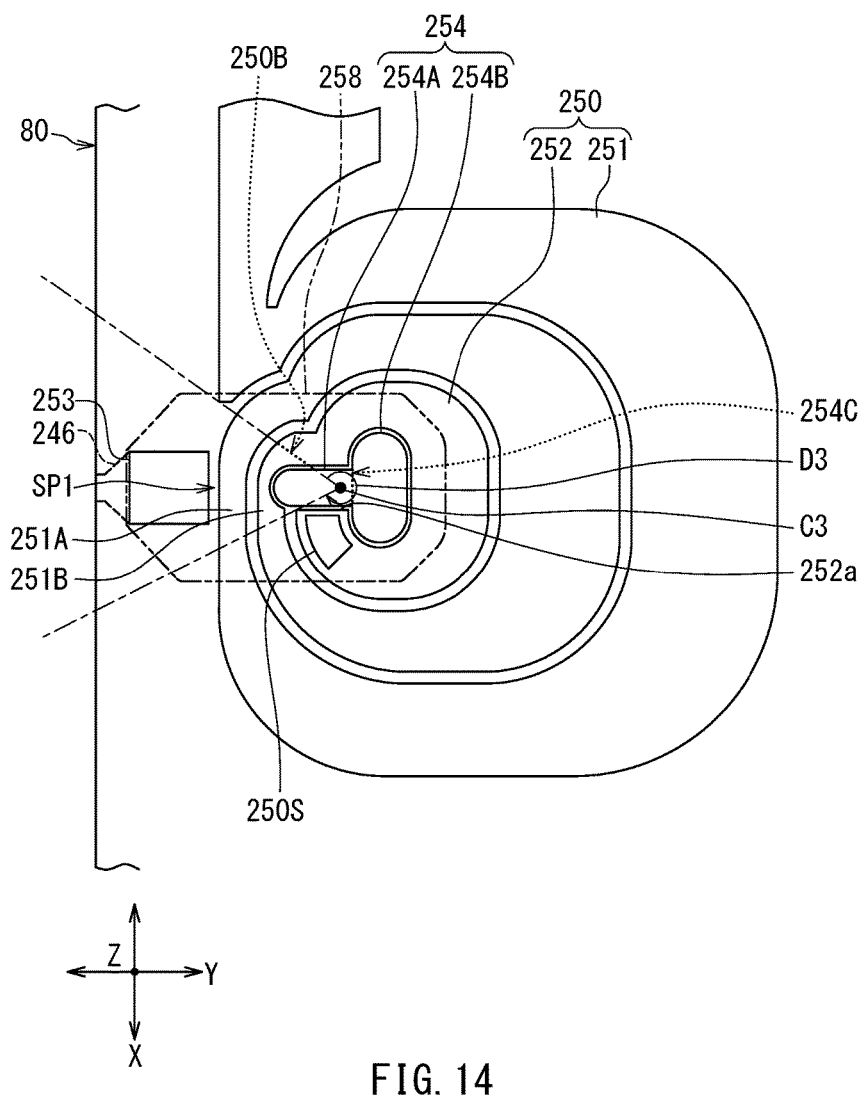
FIG. 14 is a plan view showing a coil and a core section of the magnetic head according to the fourth embodiment of the invention.

A magnetic head according to a fourth embodiment of the invention will now be described. To begin with, the configuration of the magnetic head according to the present embodiment will be described with reference to FIG. 12 to FIG. 14. FIG. 12 is a cross-sectional view of a write head unit of the magnetic head according to the present embodiment. FIG. 13 is a front view of the write head unit of the magnetic head according to the present embodiment. FIG. 14 is a plan view showing a coil and a core section of the magnetic head according to the present embodiment.

The magnetic head according to the present embodiment is for use in thermally-assisted magnetic recording. The thermally-assisted magnetic recording uses a recording medium 90 having high coercivity. When writing data, a write magnetic field and heat are applied simultaneously to the area of the recording medium 90 where to write the data, so that the area rises in temperature and drops in coercivity for data writing. The area where data is written subsequently falls in temperature and rises in coercivity to increase in thermal stability of magnetization.

The magnetic head according to the present embodiment includes a write head unit 209, in place of the write head unit 9 of the first embodiment. The write head unit 209 is disposed on the nonmagnetic layer 73. The write head unit 209 includes a coil 250 and a magnetic path forming section 210. The coil 250 is configured to produce a magnetic field corresponding to data to be written on the recording medium 90. The coil 250 is formed of a conductive material such as copper.

The magnetic path forming section 210 defines a first space SP1 (see FIG. 14) for a portion of the coil 250 to pass through, and forms a magnetic path for passing a magnetic flux corresponding to the magnetic field produced by the coil 250. In the present embodiment, the magnetic path forming section 210 includes a main pole 240. The main pole 240 has a first end face 240a located in the medium facing surface 80. The magnetic path forming section 210 is configured to pass the magnetic flux corresponding to the magnetic field produced by the coil 250 and to produce, from the first end face 240a, a write magnetic field for writing the data on the recording medium 90 by means of a perpendicular magnetic recording system. FIG. 12 shows a main cross section, that is, a cross section that intersects the first end face 240a of the main pole 240 and is perpendicular to the medium facing surface 80 and to the top surface 1a of the substrate 1.

The magnetic path forming section 210 further includes a return pole layer 211, coupling layers 212, 219A, 219B, 246, 247 and 253, two coupling sections 213A and 213B, side shields 232A and 232B, a core section 254, and a yoke layer 258. The core section 254 corresponds to the first core section of the present invention. The entire magnetic path forming section 210 except the main pole 240 is formed of a magnetic material such as CoFeN, CoNiFe, FeNi, or CoFe. The main pole 240 is formed of, for example, the same material as the main pole 15 of the first embodiment.

The return pole layer 211 is disposed on the nonmagnetic layer 73. The return pole layer 211 has an end face located in the medium facing surface 80. The write head unit 209 further includes a non-illustrated insulating layer disposed around the return pole layer 211. The non-illustrated insulating layer is formed of alumina, for example.

The coupling layer 212 is disposed on a first portion of the top surface of the return pole layer 211, the first portion being near the medium facing surface 80. The coupling layer 212 has a second end face 212a located in the medium facing surface 80. The two coupling sections 213A and 213B are disposed on two second portions of the top surface of the return pole layer 211, the two second portions being located away from the medium facing surface 80. Each of the coupling sections 213A and 213B has a first layer lying on the return pole layer 211, and a second and a third layer stacked in this order on the first layer. The first layer of the coupling section 213A and the first layer of the coupling section 213B are arranged to be adjacent in the track width direction (the X direction).

The write head unit 209 further includes an insulating layer 214 disposed on the non-illustrated insulating layer and a portion of the top surface of the return pole layer 211 other than the first and second portions. The first layers of the coupling sections 213A and 213B are embedded in the insulating layer 214. The insulating layer 214 is formed of alumina, for example.

The write head unit further includes a waveguide including a core 216 configured to propagate light, and a cladding around the core 216. As shown in FIG. 12 and FIG. 13 in particular, the core 216 has a front end face 216a facing toward the medium facing surface 80, an evanescent light generating surface 216b which is a top surface, a bottom surface 216c, and two side surfaces. The front end face 216a may be located in the medium facing surface 80 or at a distance from the medium facing surface 80. FIG. 12 and FIG. 13 show an example in which the front end face 216a is located in the medium facing surface 80.

The cladding includes cladding layers 215, 217 and 218. The cladding layer 215 lies on the coupling layer 212 and the insulating layer 214. The core 216 lies on the cladding layer 215. The cladding layer 217 lies on the cladding layer 215 and surrounds the core 216. The cladding layer 218 is disposed over the evanescent light generating surface 216b of the core 216 and the top surface of the cladding layer 217.

The core 216 is formed of a dielectric material that transmits laser light to be used for generating near-field light. The laser light emitted from a non-illustrated laser diode enters the core 216 and propagates through the core 216. The cladding layers 215, 217 and 218 are each formed of a dielectric material that has a refractive index lower than that of the core 216.

The coupling layers 219A and 219B and the second layers of the coupling sections 213A and 213B are embedded in the cladding layers 215 and 217. The coupling layer 219A and the coupling layer 219B are located on opposite sides of the core 216 in the track width direction (the X direction) and spaced from the core 216. Each of the coupling layers 219A and 219B has an end face located in the medium facing surface 80, a top surface, and a bottom surface. The bottom surface of each of the coupling layers 219A and 219B is in contact with the coupling layer 212. The second layer of the coupling section 213A and the second layer of the coupling section 213B are located farther from the medium facing surface 80 than are the coupling layers 219A and 219B, and are located on opposite sides of the core 216 in the track width direction (the X direction), each being spaced from the core 216.

The write head unit 209 further includes a plasmon generator 220 located above the core 216 in the vicinity of the medium facing surface 80. The cladding layer 218 includes a receiving section for receiving a part of the plasmon generator 220. The plasmon generator 220 has a near-field light generating surface located in the medium facing surface 80, and a plasmon exciting section located at a predetermined distance from the evanescent light generating surface 216b and facing the evanescent light generating surface 216b. The cladding layer 218 is interposed between the evanescent light generating surface 216b and the plasmon exciting section. The plasmon generator 220 is configured to excite surface plasmons on the principle to be described later.

Although not illustrated, the plasmon generator 220 may include a narrow portion located near the medium facing surface 80 and a wide portion located farther from the medium facing surface 80 than the narrow portion. The narrow portion includes the near-field light generating surface. The width of the narrow portion in the track width direction (the X direction) may be constant regardless of distance from the medium facing surface 80, or may decrease toward the medium facing surface 80. The narrow portion is smaller than the wide portion in maximum width in the track width direction.

The write head unit 209 further includes a dielectric layer 224 located farther from the medium facing surface 80 than the plasmon generator 220 and lying on the cladding layer 218, a gap film 226C formed of an insulating material and lying on the dielectric layer 224, and a non-illustrated insulating film located near the medium facing surface 80 and lying on a portion of the plasmon generator 220.

The write head unit 209 further includes gap films 226A and 226B each formed of an insulating material. The gap film 226A and the gap film 226B are located on opposite sides of the plasmon generator 220 in the track width direction (the X direction). Each of the gap films 226A and 226B has an end face located in the medium facing surface 80. The end face of the gap film 226A and the end face of the gap film 226B are located on opposite sides of at least part of the near-field light generating surface of the plasmon generator 220 in the track width direction (the X direction) so that the at least part of the near-field light generating surface is interposed between the end faces of the gap films 226A and 226B.

The gap film 226A lies on the coupling layer 219A and has an opening for exposing the top surface of the coupling layer 219A. The side shield 232A lies on the gap film 226A and contacts the top surface of the coupling layer 219A through the opening of the gap film 226A.

The gap film 226B lies on the coupling layer 219B and has an opening for exposing the top surface of the coupling layer 219B. The side shield 232B lies on the gap film 226B and contacts the top surface of the coupling layer 219B through the opening of the gap film 226B.

The write head unit 209 further includes a first heat sink 227 located away from the medium facing surface 80 and lying on the plasmon generator 220 and the gap film 226C. The first heat sink 227 is formed of Au or Cu, for example.

The main pole 240 is located on the front side in the direction of travel of the recording medium 90 (the Z direction) relative to the core 216. The plasmon generator 220 is located between the core 216 and the main pole 240. The near-field light generating surface of the plasmon generator 220 is located between the first end face 240a of the main pole 240 and the front end face 216a of the core 216.

The write head unit 209 further includes a separating film (not illustrated) formed of a nonmagnetic material and lying on the non-illustrated insulating film, the gap films 226A and 226B, the side shields 232A and 232B and the first heat sink 227. The main pole 240 lies on the separating film. Although not illustrated, the separating film is interposed between the main pole 240 and the plasmon generator 220, between the main pole 240 and the side shields 232A and 232B, between the main pole 240 and the gap films 226A and 226B, and between the main pole 240 and the first heat sink 227. The non-illustrated insulating film is interposed between the separating film and the plasmon generator 220 at a location near the medium facing surface 80.

A part of the main pole 240 is located between the side shield 232A and the side shield 232B. Another part of the main pole 240 lies over the side shields 232A and 232B with the separating film therebetween. Each of the side shields 232A and 232B has an end face located in the medium facing surface 80. The end face of the side shield 232A and the end face of the side shield 232B are located on opposite sides of at least part of the first end face 240a of the main pole 240 in the track width direction (the X direction) so that the at least part of the first end face 240a is interposed between the end faces of the side shields 232A and 232B.

The write head unit further includes a second heat sink 229 disposed around the foregoing other part of the main pole 240. The second heat sink 229 is formed of the same material as the first heat sink 227, for example. The first and second heat sinks 227 and 229 and the side shields 232A and 232B have the function of dissipating heat generated by the plasmon generator 220 outwardly from the plasmon generator 220 and the main pole 240.

The write head unit 209 further includes a dielectric layer 245 disposed around the side shields 232A and 232B and the first and second heat sinks 227 and 229. The third layers of the coupling sections 213A and 213B are embedded in the cladding layer 218, the dielectric layers 224 and 245 and the gap film 226C.

The coupling layer 246 lies on the main pole 240, the second heat sink 229 and the dielectric layer 245. The coupling layer 246 has an end face 246a located in the medium facing surface 80. The coupling layer 246 may include a narrow portion and a wide portion as shown in FIG. 14, the narrow portion having the end face 246a and an end opposite thereto, the wide portion being connected to the end of the narrow portion. The wide portion is greater than the narrow portion in width in the track width direction (the X direction). The width of the narrow portion in the track width direction is substantially constant regardless of distance from the medium facing surface 80. The width of the wide portion in the track width direction is equal to that of the narrow portion at the boundary between the narrow portion and the wide portion, and gradually increases with increasing distance from the medium facing surface 80, then becoming constant.

The coupling layer 247 lies on the third layers of the coupling sections 213A and 213B and the dielectric layer 245. The write head unit 209 further includes a dielectric layer 248 disposed around the coupling layers 246 and 247.

The coupling layer 253 lies on the coupling layer 246. The coupling layer 253 has an end face facing toward the medium facing surface 80, and this end face is located at a distance from the medium facing surface 80.

The core section 254 lies on the coupling layer 247. As shown in FIG. 14, the coil 250 is wound around the core section 254. The write head unit 209 further includes: an insulating film 255 interposed between the coil 250 and each of the coupling layer 253, the core section 254 and the dielectric layer 248; an insulating layer 256 disposed around the coil 250 and the coupling layer 253 and in the space between adjacent turns of the coil 250; and an insulating layer 257 lying on the coil 250, the insulating film 255 and the insulating layer 256. The insulating film 255 and the insulating layers 256 and 257 are formed of alumina, for example.

The yoke layer 258 lies on the coupling layer 253, the core section 254 and the insulating layer 257. The yoke layer 258 has an end face facing toward the medium facing surface 80, and this end face is located at a distance from the medium facing surface 80. The write head unit 209 further includes an insulating layer 259 disposed around the yoke layer 258. The insulating layer 259 is formed of alumina, for example.

Now, the coil 250 and the core section 254 will be described in detail with reference to FIG. 12 and FIG. 14. The coil 250 has a coil connection 250S electrically connected to a lead layer that is not illustrated. The lead layer is embedded in the insulating layer 259, for example. In this case, the lead layer penetrates the insulating layer 257 and is electrically connected to the coil connection 250S.

As has been described in relation to the first embodiment, the first direction is a direction parallel to the Z direction. FIG. 14 shows the coil 250 and the core section 254 as viewed in the first direction. As shown in FIG. 14, the coil 250 is wound around the entire perimeter of the core section 254 when viewed in the first direction. The coil 250 includes a first winding portion 251 and a second winding portion 252 connected in series. In FIG. 14, the boundary 250B between the first winding portion 251 and the second winding portion 252 is shown by a dotted line. The first winding portion 251 includes two first coil elements 251A and 251B extending to pass through the first space SP1. The first coil elements 251A and 251B are arranged in this order in the third direction (the Y direction), the first coil element 251A being closer to the medium facing surface 80 than the first coil element 251B. The first winding portion 251 extends twice around the entire perimeter of the core section 254 when viewed in the first direction.

In FIG. 14, the point denoted by symbol C3 indicates a center point C3 of the core section 254. The center point C3 of the core section 254 is a point located at a center of the core section 254 in the second direction (the X direction) and also in the third direction (the Y direction) when viewed in the first direction. The second winding portion 252 does not pass through the first space SP1 and, when viewed in the first direction, the second winding portion 252 extends less than once around the entire perimeter of the core section 254 and rotates n degrees about the center point C3 of the core section 254. In FIG. 14, the arrow labeled D3 indicates the direction of rotation of the second winding portion 252. The foregoing n is greater than 270 and smaller than 360, and is preferably no smaller than 288 and no greater than 324. In the example shown in FIG. 14, n is 298.

As shown in FIG. 14, the core section 254 includes a first portion 254A and a second portion 254B coupled to each other. In FIG. 14 the boundary 254C between the first portion 254A and the second portion 254B is indicated by a dotted line. When viewed in the first direction, the first portion 254A is located closer to the medium facing surface 80 than the second portion 254B. The first portion 254A is smaller than the second portion 254B in maximum dimension in the second direction (the X direction). The first and second portions 254A and 254B are the same in shape as the first and second portions 42A and 42B of the upper core section 42 of the first embodiment. The first portion 254A includes a constant-width portion as does the first portion 42A.

The second winding portion 252 has an end 252a that is located on the opposite side from the boundary with the first winding portion 251 when viewed in the first direction. When viewed in the first direction, the end 252a of the second winding portion 252 is located on one side of the first portion 254A in the second direction (the X direction). In the example shown in FIG. 14, the end 252a of the second winding portion 252 is located at a predetermined distance from the constant-width portion of the first portion 254A.

In the present embodiment, the magnetic path forming section 210 forms a magnetic path from the second end face 212a to the first end face 240a. The first space SP1 is defined by this magnetic path.

Now, the principle of generation of near-field light in the present embodiment and the principle of thermally-assisted magnetic recording using near-field light will be described in detail. Laser light emitted from a laser diode (not illustrated) enters the core 216. As shown in FIG. 12, the laser light 270 propagates through the core 216 toward the medium facing surface 80, and reaches the vicinity of the plasmon generator 220. The evanescent light generating surface 216b of the core 216 generates evanescent light based on the laser light 270 propagating through the core 216. More specifically, the laser light 270 is totally reflected at the evanescent light generating surface 216b, and this causes the evanescent light generating surface 216b to generate evanescent light permeating into the cladding layer 218. In the plasmon generator 220, surface plasmons are excited on the plasmon exciting section through coupling with the aforementioned evanescent light. The surface plasmons propagate to the near-field light generating surface, and near-field light is generated from the near-field light generating surface based on the surface plasmons.

The near-field light generated from the near-field light generating surface is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 240 for data writing.

Now, functions and effects specific to the thermally-assisted magnetic recording head according to the present embodiment will be described. In the present embodiment, as described above, the coil 250 includes the first winding portion 251 and the second winding portion 252 connected in series. The first winding portion 251 includes two first coil elements 251A and 251B extending to pass through the first space SP1, whereas the second winding portion 252 includes no portion passing through the first space SP1. This enables a reduction in the length of the magnetic path formed by the magnetic path forming section 210. The present embodiment thus makes it possible to achieve write signals of higher frequency, and to thereby achieve higher recording densities.

In the present embodiment, the second winding portion 252 is wound about the center point C3 of the core section 254 and extends less than once around the entire perimeter of the core section 254. The angle of rotation of the second winding portion 252 is greater than 270 degrees and smaller than 360 degrees. In other words, the second winding portion 252 has more than ¾ and less than one turn. The present embodiment thus enables a sufficient increase in the magnetomotive force of the coil 250.

Further, in the present embodiment, the core section 254 includes the first portion 254A and the second portion 254B coupled to each other, and the first portion 254A is smaller than the second portion 254B in maximum dimension in the second direction (the X direction). Further, when viewed in the first direction, the end 252a of the second winding portion 252 is located on one side of the first portion 254A of the core section 254 in the second direction (the X direction). By virtue of these features, the present embodiment allows the angle of rotation of the second winding portion 252 to be greater than in the case where the first portion 254A is not smaller than the second portion 254B in maximum dimension in the second direction. In the present embodiment, in particular, the foregoing features enables the second winding portion 252 to have more than ¾ and less than one turn.

The remainder of configuration, function and effects of the present embodiment are similar to those of the first embodiment.

The present invention is not limited to the foregoing embodiments, and various modifications may be made thereto. For example, as far as the requirements of the appended claims are met, the first to fourth winding portions and the first and second core sections may be shaped and located in any desired manner, and need not necessarily be as in the respective examples illustrated in the foregoing embodiments.

What is claimed is:

1. A magnetic head comprising:
a medium facing surface configured to face a recording medium;
a coil configured to produce a magnetic field corresponding to data to be written on the recording medium; and
a magnetic path forming section for defining a first space for a portion of the coil to pass through, and forming a magnetic path for passing a magnetic flux corresponding to the magnetic field produced by the coil, wherein
the magnetic path forming section has a first end face located in the medium facing surface and a second end face located in the medium facing surface, and is configured to produce from the first end face a write magnetic field for writing the data on the recording medium,
the magnetic path forming section includes a first core section,
the coil is wound around an entire perimeter of the first core section when viewed in a first direction, the first direction being a direction perpendicular to a second direction and a third direction, the second direction being a direction of track width, the third direction being a direction perpendicular to the medium facing surface,
the coil includes a first winding portion and a second winding portion connected in series,
the first winding portion includes one or two first coil elements extending to pass through the first space, and extends once or twice around the entire perimeter of the first core section when viewed in the first direction,
the second winding portion does not pass through the first space and, when viewed in the first direction, the second winding portion extends less than once around the entire perimeter of the first core section and rotates n degrees about a center point of the first core section, the center point of the first core section being a point located at a center of the first core section in the second direction and also in the third direction when viewed in the first direction, and
wherein n is greater than 270 and smaller than 360.

2. The magnetic head according to claim 1, wherein n is no smaller than 288 and no greater than 324.

3. The magnetic head according to claim 1, wherein
the first core section includes a first portion and a second portion coupled to each other,
when viewed in the first direction, the first portion is located closer to the medium facing surface than the second portion, and the first portion is smaller than the second portion in maximum dimension in the second direction,
the second winding portion has an end that is located on an opposite side from a boundary between the first winding portion and the second winding portion when viewed in the first direction, and
when viewed in the first direction, the end of the second winding portion is located on one side of the first portion in the second direction.

4. The magnetic head according to claim 1, wherein
the magnetic path forming section includes: a main pole having the first end face; and a first return path section having the second end face and connected to the main pole, and
the first return path section includes the first core section.

5. The magnetic head according to claim 4, wherein
the magnetic path forming section further includes a second return path section connected to the main pole and having a third end face located in the medium facing surface, and
the main pole and the second return path section define a second space for another portion of the coil to pass through.

6. The magnetic head according to claim 5, wherein
the second return path section includes a second core section,
the coil includes a third winding portion, and
the third winding portion includes one third coil element extending to pass through the second space, and extends once around an entire perimeter of the second core portion when viewed in the first direction.

7. The magnetic head according to claim 6, wherein the first return path section is located on a front side in a direction of travel of the recording medium relative to the main pole, and the second return path section is located on a rear side in the direction of travel of the recording medium relative to the main pole.

8. The magnetic head according to claim 6, wherein the first return path section is located on a rear side in a direction of travel of the recording medium relative to the main pole, and the second return path section is located on a front side in the direction of travel of the recording medium relative to the main pole.

9. The magnetic head according to claim 5, wherein
the second return path section includes a second core section,
the coil further includes a third winding portion and a fourth winding portion connected in series,
the third winding portion includes one or two third coil elements extending to pass through the second space, and extends once or twice around an entire perimeter of the second core section when viewed in the first direction,
the fourth winding portion does not pass through the second space and, when viewed in the first direction, the fourth winding portion extends less than once around the entire perimeter of the second core section and rotates m degrees about a center point of the second core section, the center point of the second core section being a point located at a center of the second core section in the second direction and also in the third direction when viewed in the first direction, and
m is greater than 270 and smaller than 360.

10. The magnetic head according to claim 9, wherein m is no smaller than 288 and no greater than 324.

11. The magnetic head according to claim 9, wherein
the second core section includes a third portion and a fourth portion coupled to each other,
when viewed in the first direction, the third portion is located closer to the medium facing surface than the fourth portion, and the third portion is smaller than the fourth portion in maximum dimension in the second direction,
the fourth winding portion has an end that is located on an opposite side from a boundary with the third winding portion when viewed in the first direction, and when viewed in the first direction, the end of the fourth winding portion is located on one side of the third portion in the first direction.

* * * * *